(12) United States Patent
Harada

(10) Patent No.: US 6,862,100 B2
(45) Date of Patent: *Mar. 1, 2005

(54) DETERMINING A TYPE OF PRINT DATA TO BE SENT TO A PRINTER BASED ON THE NUMBER OF UNPROCESSED FILES RESIDING IN A PRINT QUEUE

(75) Inventor: Takuto Harada, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 125 days.

(21) Appl. No.: 08/458,841

(22) Filed: Jun. 2, 1995

(65) Prior Publication Data

US 2001/0040688 A1 Nov. 15, 2001

(30) Foreign Application Priority Data

Jun. 9, 1994 (JP) .............................. 6-127244
Jul. 27, 1994 (JP) .............................. 6-175293

(51) Int. Cl.⁷ .............................. G06F 15/00
(52) U.S. Cl. .................. 358/1.13; 358/1.15; 358/1.16
(58) Field of Search .............................. 395/112, 113, 395/114, 115, 116, 101, 109; 358/404, 444, 407, 468, 1.13, 1.14, 1.15, 1.16, 1.17, 1.1, 1.9

(56) References Cited

U.S. PATENT DOCUMENTS

| | | | | |
|---|---|---|---|---|
| 4,640,634 A | | 2/1987 | Ozawa et al. | |
| 5,113,355 A | * | 5/1992 | Nomura | 395/109 |
| 5,287,194 A | * | 2/1994 | Lobiondo | 395/114 |
| 5,327,526 A | * | 7/1994 | Nomura et al. | 395/115 |
| 5,337,258 A | * | 8/1994 | Dennis | 364/551.01 |
| 5,469,533 A | * | 11/1995 | Dennis | 395/114 |

FOREIGN PATENT DOCUMENTS

| | | |
|---|---|---|
| DE | 195 35 326 | 3/1997 |
| EP | 0 522 754 | 1/1993 |
| JP | 4-65259 | 3/1992 |
| JP | 6-1011 | 1/1994 |
| JP | 6-168084 | 6/1994 |
| JP | 10-76731 | 3/1998 |
| WO | 89/09135 | 10/1989 |

OTHER PUBLICATIONS

Blaskovic et al., "Spring–Loaded Automatic Belt Tensioner", *IBM Technical Disclosure Bulletin*, vol. 24, No. 1A, Jun. 1981.

* cited by examiner

Primary Examiner—Gabriel Garcia
(74) Attorney, Agent, or Firm—Fitzpatrick, Cella, Harper & Scinto

(57) ABSTRACT

A printer system in which, when print data is provided to be transferred to a printer, the type of print data to be sent to the printer is determined based on information representing the number of currently unprocessed files residing in a print queue of the printer. There is output either data described in a printer language or data representing a bit map image derived from the data described in a printer language, according to the type of print data that was determined.

40 Claims, 10 Drawing Sheets

DETERMINING A TYPE OF PRINT DATA TO BE SENT TO A PRINTER BASED ON THE NUMBER OF UNPROCESSED FILES RESIDING IN A PRINT QUEUE

BACKGROUND OF THE INVENTION

The present invention relates to a printer, and a control unit and method for the printer.

In general, a printer receives print data from a host computer or the like, analyzes the received print data, and produces bit map data. The printer produces a visible image on a recording medium using the produced bit map data and outputs the image.

A typical printer of the above kind is a page printer (in particular, a laser printer) which is rapidly winning popularity these days. In general, when this kind of printer is used, a host computer that is an upper-level unit transmits print data described in dedicated page description language.

The printer therefore analyzes the received print data (composed of various commands), translates it into intermediate-language data, and produces bit map data using the intermediate-language data.

The pager printer is being adopted more widely because of the high speed and excellent quality of output images. In some printers, a large-capacity storage such as a hard disk is installed and used as a printer buffer in an effort to release an upper-level unit from a job of outputting print data.

A printer having a storage stores received print data in the form of a file and prints data that has been stored first (hereinafter, an action of storing received print data in the form of a file in a storage is referred to as "spooling," and a resultant file is referred to as a "spool file").

A general system (comprising a host computer and a printer) will be described in conjunction with a functional block diagram of FIG. 1.

In response to a print instruction (entered by an operator) through any kind of running application program, a host computer 101 translates print data 102, which is instructed to print, into printer language-written data compatible with a printer 105. After saving some printer language-written data in a spooler 103 (designed to translate data into printer language-written data), the host computer 101 transmits the data into the printer 105 via a communication channel 104.

Meanwhile, the printer spools received data in a spooler 106, and fetches data in the order in which the oldest spool file is fetched first. The fetched data is then analyzed by an emulator 107. A bit map is then expanded in a memory on the basis of the result of analysis. After bit map data concerning one page is expanded in the memory, the data is transferred to a printer engine 108 according to a given procedure. Printing is then achieved.

When numerous spool files reside in the printer, time must be spent before printing of an intended spool file is started. The waiting time depends on the lengths of spool files printed before the printing of an intended spool file is started, and on the printing capability of the printer. This means that the waiting time depends on the processing capability of the printer.

The processing capability of a printer will be discussed. Processing performed by a printer includes analyzing commands contained in print data, expanding print data into bit map data in a print buffer on the basis of the result of analysis, and printing print data according to the bit map data expanded in the print buffer. Above all, printing based on bit map data (for example, for a laser beam printer, bit map data is transferred as video signals in order to drive semiconductor laser elements, and a latent image is formed on a photosensitive drum, developed, and then transferred to a recording medium) is fixed due to mechanical restraints. If a printer permits fast command analysis and fast bit map expansion, the printer would prove very useful.

SUMMARY OF THE INVENTION

The present invention attempts to solve the foregoing problems. An object of the present invention is to provide a printer, and a control unit and method for the printer which can provide an intended result of printing according to the state of a printer.

In order to accomplish the above object, a printer in accordance with the present invention has the components described below.

A printer for recording a visible image on a given recording medium using print data sent from an external unit and outputting the result of recording, comprising:

a saving means for saving input print data in the form of files sequentially in a given storage means;

a determining means for determining whether a file saved by said saving means is of a first type composed of commands described in printer language or of a second type containing a bit image to be printed;

a control means that when said determining means determines that a file to be processed is of the first type, produces bit map data using the file and performs printing, and that when said determining means determines that a file to be processed is of the second type, prints a bit image contained in the file; and a returning means that when receiving given information from said external unit, returns information representing the length of a print queue to said external unit.

An external unit, comprising:

a determining means that for transferring print data to a printer, transfers given information to said printer and determines the length of a print queue existent in said printer according to information sent from said printer, and an output means that according to the result of determination made by said determining means, outputs as print data either data described in printer language or data representing a bit image and deriving from said data described in printer language.

With the foregoing configuration, when receiving given information from the external-level unit, the printer returns information representing the length of a print queue existent in the printer to the external unit. The external-level unit determines on the basis the information whether data described in printer language or data representing a bit image and deriving from the data described in printer language, and provides the printer with either of the data.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Referring to the appended drawings, embodiments of the present invention will be described.

The structure of a printer of an embodiment will be described in conjunction with FIG. 3. In this embodiment, a laser beam printer (hereinafter, LBP) is given as an example. The present invention is not limited to the LBP.

Figure 3:
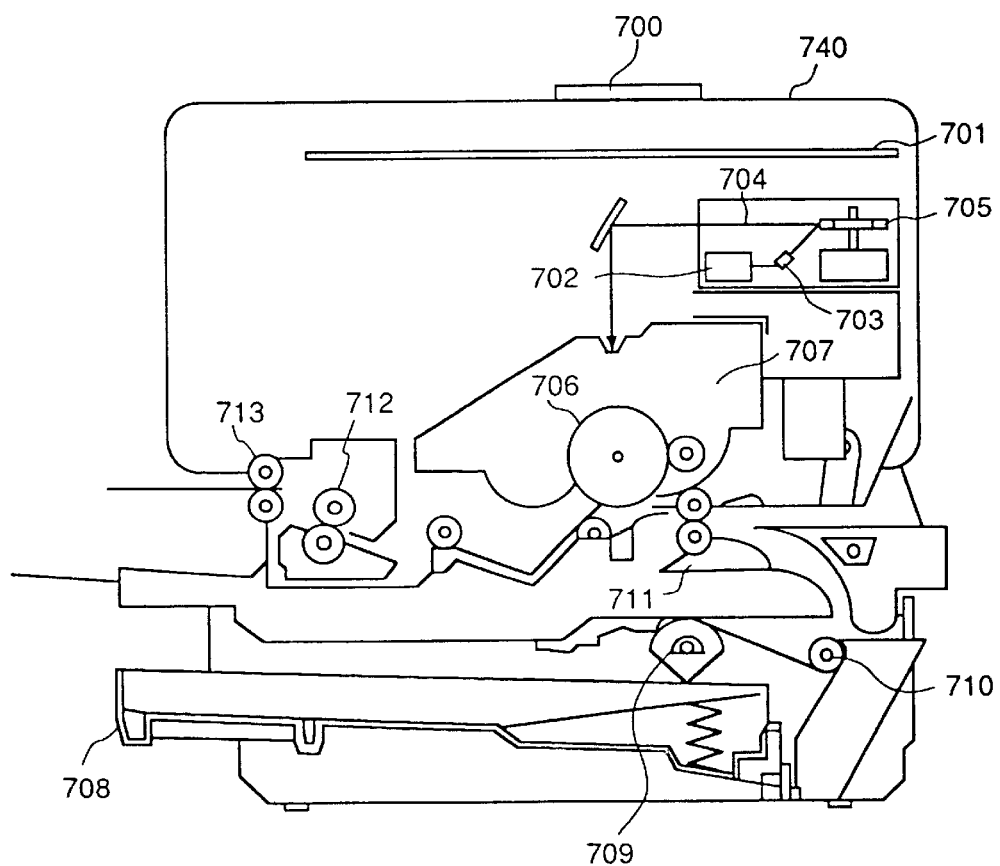
FIG. 3 is a sectional view showing the structure of the printer of the first embodiment.

In FIG. 3, reference numeral 740 denotes a LBP body. The LBP body 740 receives character information (character codes), form information, or a macro instruction from a host computer connected externally, stores it, creates a character pattern or form pattern according to the information, and produces an image on recording paper or a recording medium. 700 denotes an operation panel on which operating switches and an LCD are arranged. 701 denotes a printer control unit for controlling the whole of the LBP 740 and analyzing character information supplied from the host computer. The control unit 701 converts a character into a video signal representing a corresponding character pattern and outputs it to a laser driver 702. The laser driver 702 is a circuit for driving a semiconductor laser 703 and turning on or off a laser beam 704 emanating from the semiconductor laser 703 according to an input video signal. The laser beam 704 is deflected laterally by means of a rotary polygon mirror 705, thus scanning an electrostatic drum 706. An electrostatic latent image of a character pattern or the like is formed on the electrostatic drum 706. The latent image is developed by a developing unit 707 surrounding the electrostatic drum 706, and then transferred to recording paper.

Cut sheets of paper are used as recording paper. Cut sheets of recording paper are stowed in a paper cassette 708 mounted in the LBP 700, taken in by a paper feed roller 709 and transport rollers 710 and 711, and then supplied to the electrostatic drum 706. A toner image formed on the electrostatic drum 706 by the developing unit 707 is transferred onto carried recording paper. Thereafter, the recording paper is transported toward a fuser 712. Toner is fused on the recording paper. Finally, the recording paper is ejected externally by means of ejection rollers 713.

Figure 1:
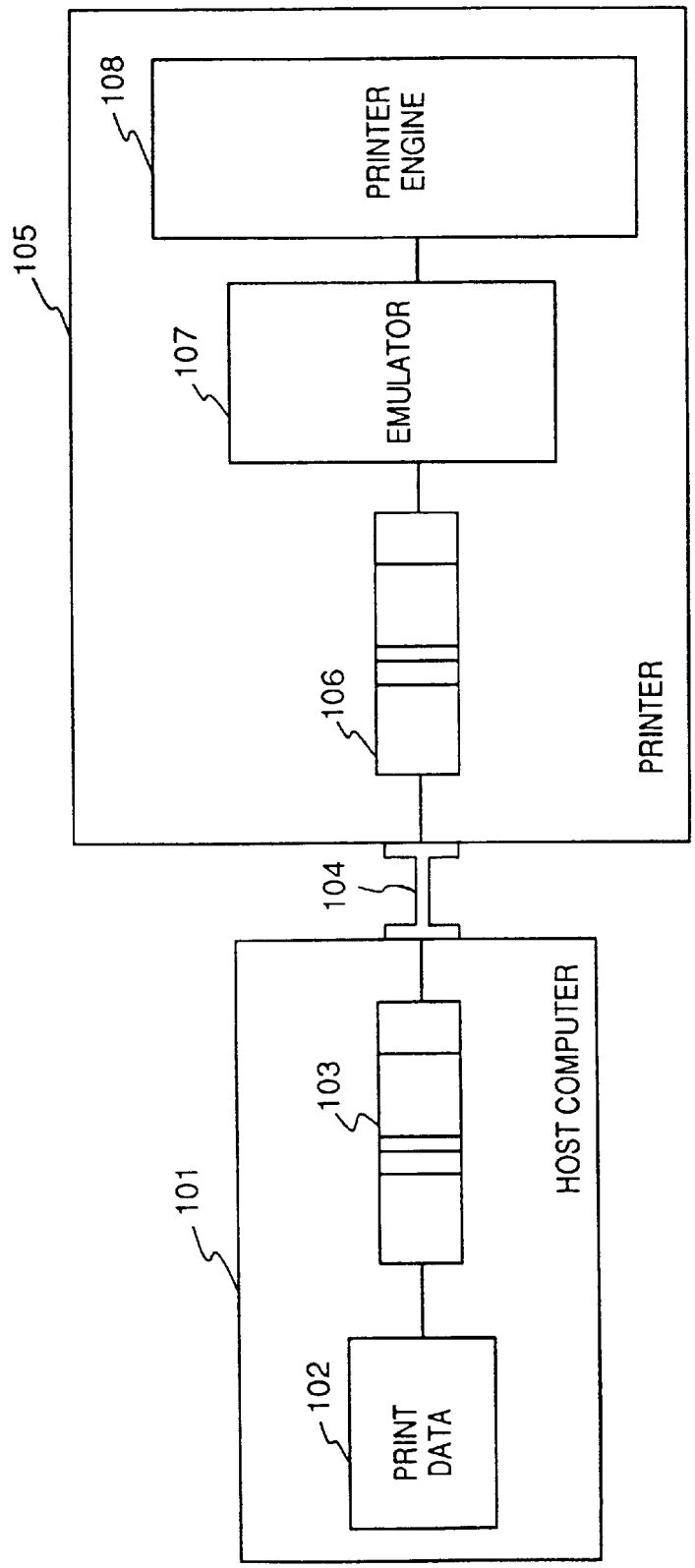
FIG. 1 is a conceptual diagram showing processes adopted in a conventional printer.
Figure 2:
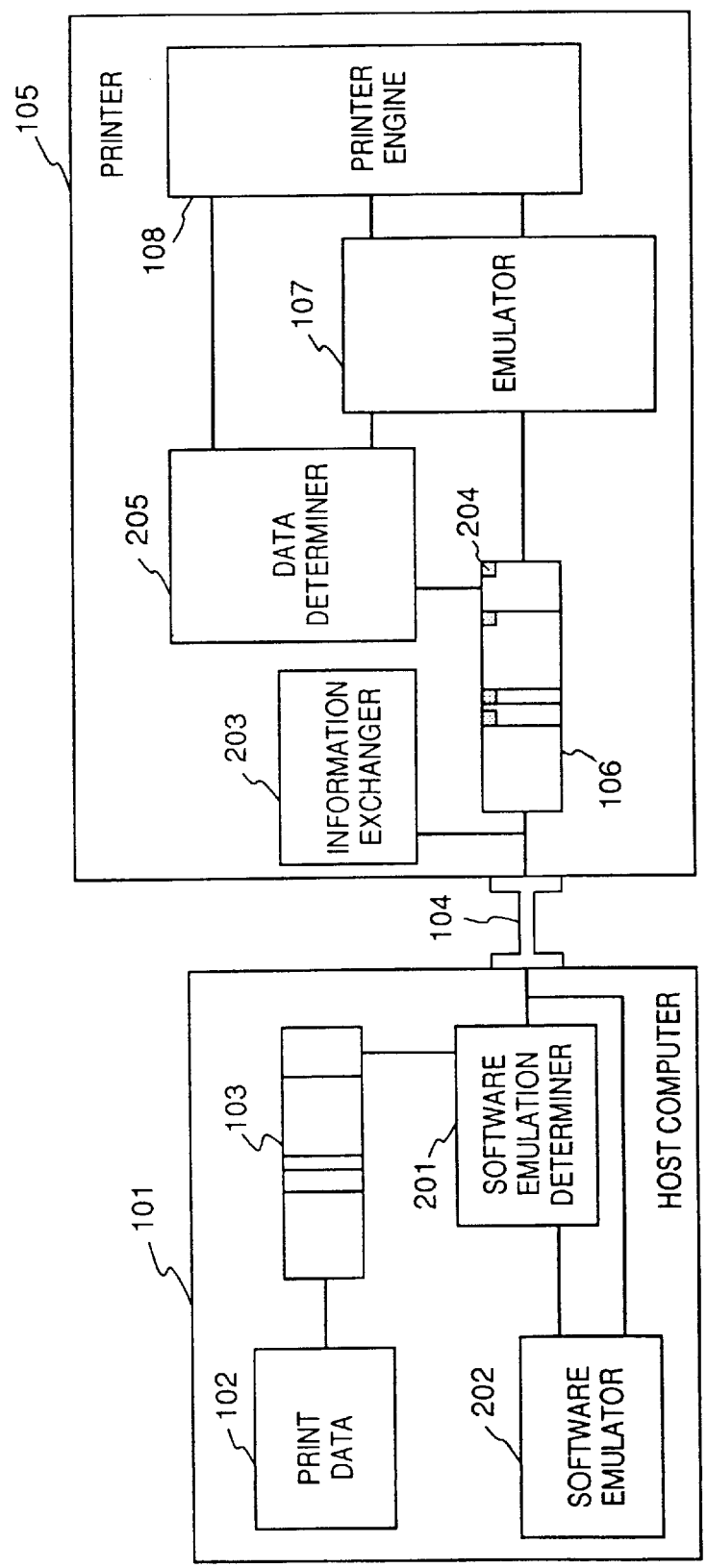
FIG. 2 is a conceptual diagram showing processes adopted in a printer of a first embodiment.

FIG. 2 is a functional block diagram showing a system (comprising a host computer and a printer) in accordance with the first embodiment. Components having the same functions as those described in conjunction with FIG. 1 are assigned the same reference numerals.

In FIG. 2, reference numeral 201 denotes a software emulation determiner for determining the state of the printer and determining whether print data should be expanded and then transmitted or left unprocessed and then transmitted. 202 denotes a software emulator for expanding print data sent from the software emulation determiner 201 into a bit map image.

Reference numeral 203 denotes an information exchanger for exchanging information with a host computer 102. 204 denotes a flag indicating whether or not data concerned has already been expanded. 205 denotes a data determiner for checking the flag 204 in a spool file so as to determine a data transmission destination.

In FIG. 2, spool files received from the host computer 101 are sequentially saved (queued) in a spooler 106 (preserved in a storage such as a hard disk).

A channel 104 differs from the one shown in FIG. 1 in a point that the channel 104 enables bi-directional data transfer.

A job stream employed in the embodiment having the foregoing components will be described below.

When print data is input to the host computer 101 (an operator gives a print instruction to an application program running under the host computer), the data 102 to be printed (hereinafter, a unit of work for handling one print data set is referred to as a job) is temporarily saved in the spooler 103. The software emulation determiner 201 issues a given command so as to inquire about the number of spool files residing in the printer 105 at that time.

In response to the command, the information exchanger 203 in the printer detects the number of spool files saved in the spooler 106 at that time and returns the detected number of spool files to the host computer 101 in the form of a given format.

The software emulation determiner 201 in the host computer 101 receives the data, detects the number of spool files queued in the printer 105, compares the number of spool files with a predetermined value, and thus determines the length of a job queue existent in the printer 105. When detecting that the number of queued spool files, which are representations of jobs, is large, the software emulation determiner 201 activates the software emulator 202 in the host computer 101 and instructs the software emulator 202 to handle a job. Thus, the software emulator 202 performs the same processing as the emulator 107 in the printer so as to produce bit map data. The (job completion) flag 204 indicating that a step of producing bit map data is completed is then set to one. The bit map data is then transferred together with the flag to the printer 105 via the channel 104.

When detecting that only a small number of spool files or jobs are queued in the printer 105, the software emulation determiner 201 resets the job completion flag 204 to zero and transfers print data (described using a printer language that can be interpreted by the printer 105) contained in a spool file in the spooler 103 together with the flag to the printer 105.

As a result, data that has been expanded into a bit map and data that has not been expanded coexist in the spooler 106 in the printer 105. The data sets are distinguished from each other by checking the job completion flags 204 appended thereto. The distinguishing is achieved by the data determiner 205. Data, to which the job completion flag 204 that is set to one is appended, is transferred directly to a printer engine 108 (See FIG. 3) according to a given procedure, whereby printing is achieved. Data, to which the job completion flag 204 that is reset to zero is appended, is passed to the emulator 107, and then normally analyzed and expanded. Resultant bit map data is transferred to the printer engine 108 for the purpose of printing.

Figure 4:
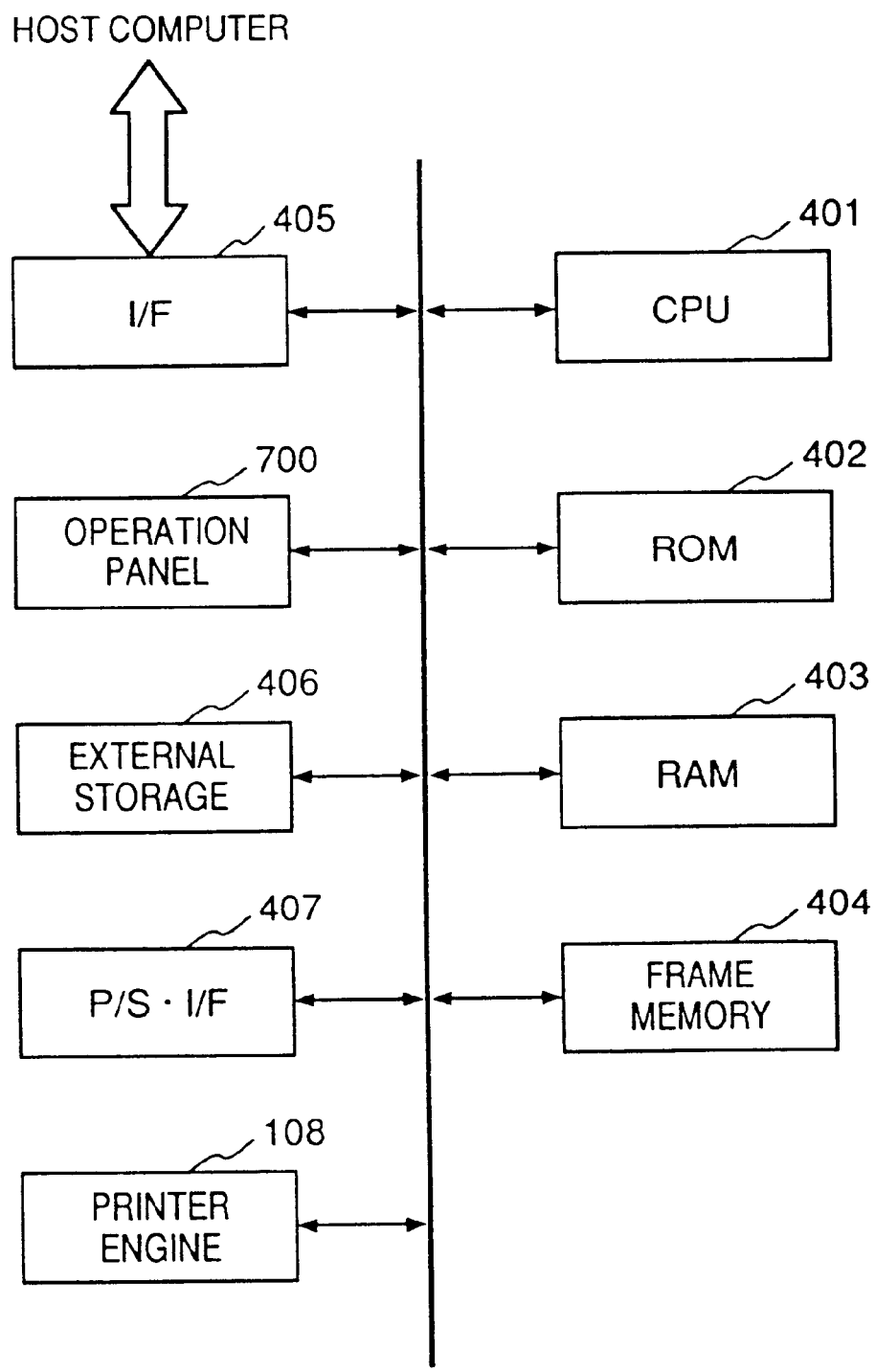
FIG. 4 is a block diagram showing the printer of the first embodiment.

FIG. 4 is a block diagram showing the printer of the embodiment more particularly. The host computer has the same configuration as a normal one. Programs to be described later should merely be installed in the host computer. No mention will therefore be made of the host computer.

In FIG. 4, reference numeral 401 denotes a CPU responsible for control of the whole printer. 402 denotes a ROM storing procedures (corresponding to programs described in the flowcharts of FIGS. 6 and 7) that describe actions taken by the CPU 401. 403 denotes a RAM used as a work area by the CPU 401. Font data (representing outline fonts) is stored in the ROM 402. The CPU 401 operates as a processing unit for the information exchanger 203, data determiner 205, or emulator 107 in FIG. 2. 404 denotes a frame memory having a storage capacity that is large enough to expand print data into bit map data concerning one page.

Reference numeral 405 denotes an interface for receiving print data from the host computer or transmitting status information from the printer. 406 denotes a large-capacity external storage realized with a hard disk or the like. Savers (corresponding to the spooler 106 in FIG. 2) of spool files and data representing various fonts are stored in the storage 406. 407 denotes a P/S interface for converting data instructed under the control of the CPU 401 into serial data synchronously with a known BD signal sent from the printer engine 108 and transmitting the serial data as a video signal into the printer engine 108.

Figure 5:
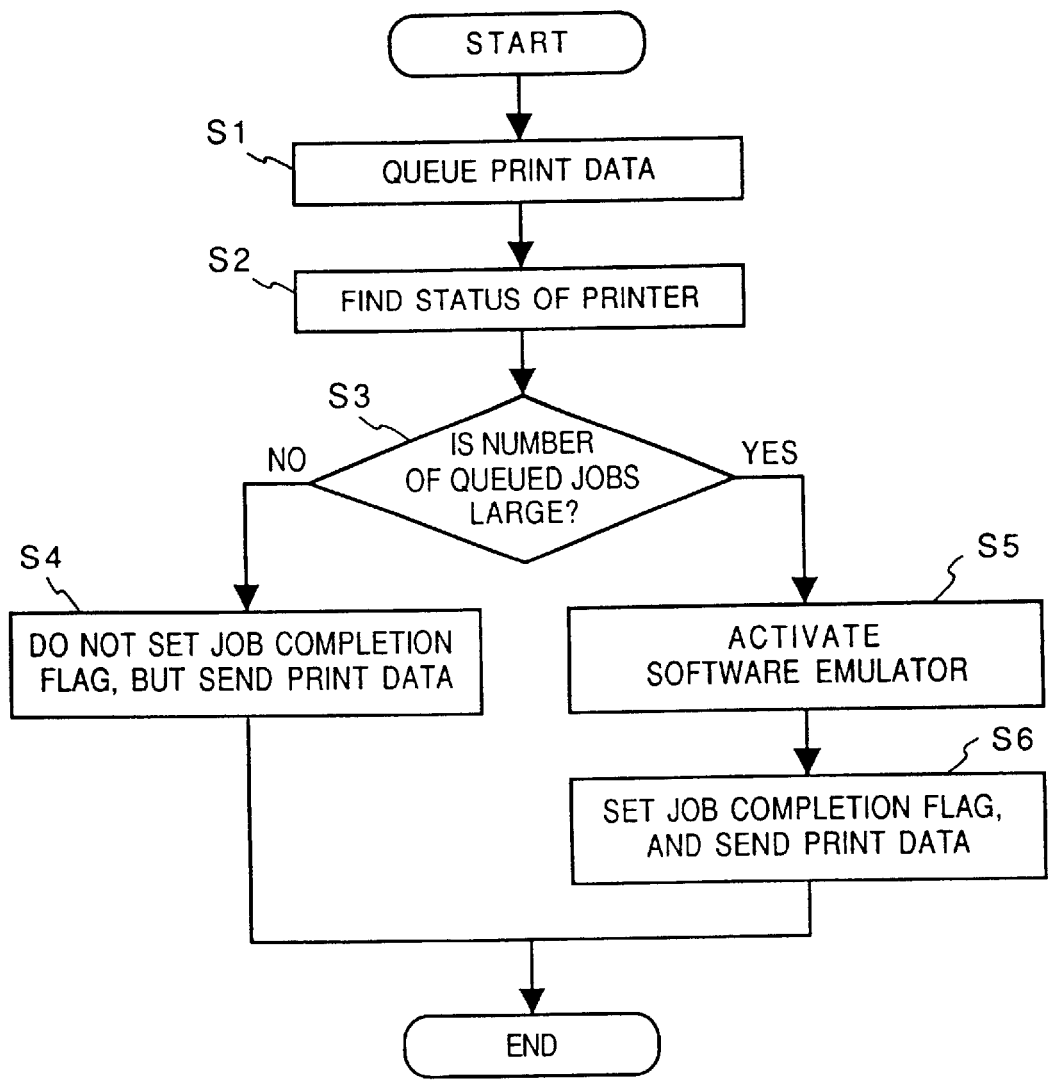
FIG. 5 is a flowchart describing a procedure followed by a host computer in the first embodiment.

Prior to actions taken by the above components, a procedure of transmitting print data to be executed by the CPU (not shown) in the host computer will be described in conjunction with the flowchart of FIG. 5.

First, a print instruction is received. At step S1, data for use in transmitting print data to the printer 105 is produced and then queued in a hard disk (not shown). At step S2, a given command (status request command) is transmitted to the printer 105 in order to find the current state of the printer 105 (that is, the number of unprocessed jobs).

Next, control is passed to step S3. The found number of unprocessed or queued jobs is compared with a given threshold in order to determine whether the number of queued jobs is large.

If the number of queued jobs is small, control is passed to step S4. The job completion flag is not set (remains reset), and the flag and print data are sent to the printer.

When it is determined that the number of unprocessed or queued jobs is large, control is passed to step S5. Processing similar to the one performed by the emulator in the printer is performed; that is, bit map expansion is executed in the host computer. After bit map data is produced, the job completion flag is set to one. The flag and bit map data are transmitted as print data to the printer.

Next, a procedure describing actions taken by the CPU 401 in the printer in FIG. 4 will be described in conjunction with FIGS. 6 and 7.

Figure 6:
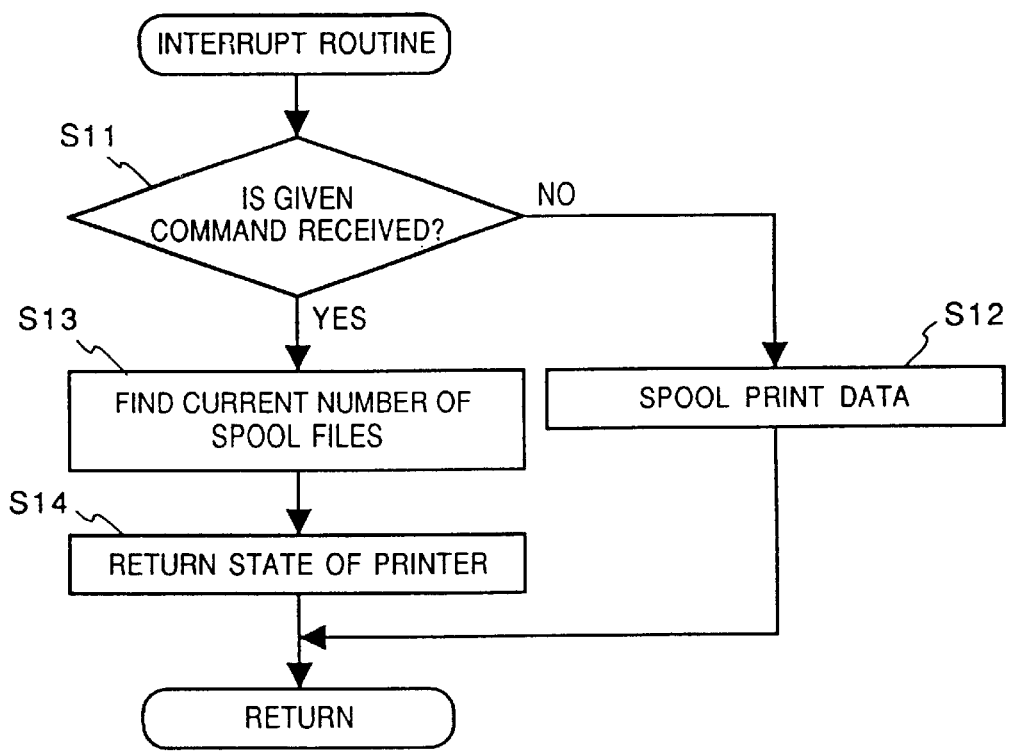
FIG. 6 is a flowchart describing the contents of interruption performed by the printer of the first embodiment.
Figure 7:
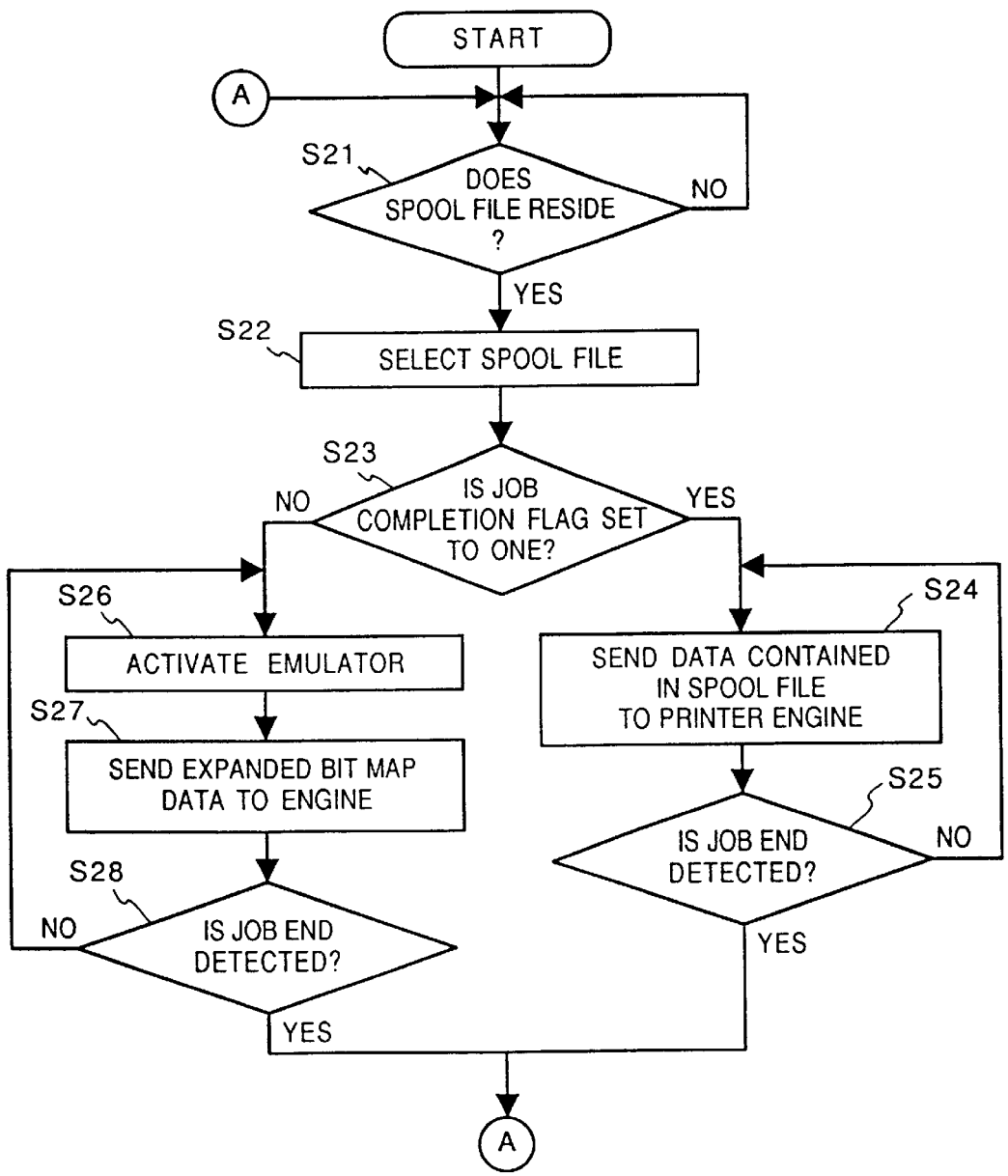
FIG. 7 is a flowchart describing a main routine of printing performed by the printer of the first embodiment.

FIG. 6 shows a routine that when the host computer transmits data to the printer, is executed with an interrupt signal sent from the interface 405.

First, at step S11, it is determined whether received data is a status request command requesting the state of the host computer. If it is determined that the received data is not the request command or is print data, control is passed to step S12. The print data is saved in the form of a spool file in the external storage 406. At this time, if the print data is recognized as the start of a job, the new job is placed in a job management table (which is supposed to be created in the external storage 406) that is not shown. Printing proceeds according to the contents of the table.

If it is determined that the received data is the status request command, control is passed to step S13. The job management table is then referenced (the external storage 406 may be referenced directly, but referencing of the table leads to faster processing) in order to find the number of currently unprocessed jobs. The number of unprocessed jobs is arranged according to a given format, and returned to the host computer.

Next, printing actually performed in the printer will be described in conjunction with the flowchart of FIG. 7.

First, at step S21, the job management table is referenced to determine whether an unprocessed (queued) spool file (that is a representation of a job) resides in the external storage 406. A wait state is set until a job is found.

If it is determined that an unprocessed job resides, control is passed to step S22. One job is selected (the first job placed in the job management table is selected). At step S23, the job completion flag appended to the start of the job is checked.

If the job completion flag is set, the job is bit map data. This means that neither command interpretation nor bit map expansion is necessary. In this case, control is passed to step S24. The bit map data is read, and transferred to the printer engine 108 via the PS interface 407. Printing is then performed. The processing of step S24 is repeated until a job end is detected at step S25.

If the job completion flag appended to the selected job is reset to zero, control is passed to step S26.

The emulator is activated. Command interpretation is executed, and print data is placed and expanded in the frame memory 404. When bit map data concerning one page is expanded in the frame memory 404, control is passed to step S27. The expanded bit map data is transferred to the printer engine. Steps S26 and 27 are repeated until a job end is detected at step S28.

As mentioned above, when the job completion flag is set to one, bit map data read from the external storage 406 is transferred directly to the printer engine. Alternatively, the bit map data may be expanded in the frame memory 404 and then transmitted.

In the foregoing embodiment, the length of a job queue in the printer is determined by checking the number of unprocessed jobs. The present invention is not limited to this working mode.

As described previously, the processing speed attained by a printer is higher relative to a job saved as bit map data than relative to print data described in page description language. It is therefore conceivable that information (which can be acquired by checking the job completion flag) for use in determining whether each job is bit map data or data described in page description language is stored in the job management table, and that information representing a job queue length is produced using the job management table and then returned to the host computer. In general, as long as bit map data is concerned, time required for printing can be quantitatively determined on the basis of the amount of the data. However, as long as data described in page description language is concerned, the time required for printing cannot be determined accurately on the basis of the amount of data alone. It is, however, true that the amount of data and the time required to complete printing have some relation to each other. Typical values are therefore adopted as a reference amount of data and reference time required to complete printing. When a new job is accepted, information representing time required to start printing is returned to the host computer.

Based on the information, the host computer automatically activates the emulator and determines whether bit map data or data written in page description language should be transferred. Alternatively, depending on the purpose of use, an operator may be able to determine whether bit map data or data written in page description language should be transferred. The time required to start printing may be displayed in a screen, thus prompting the operator for an instruction.

In the aforesaid embodiment, the number of unprocessed jobs is checked to determine the length of a job queue in the printer. Alternatively, high-speed emulation may be realized by storing an emulation speed permitted by a currently connected printer in a host computer and by comparing an emulation speed (which is stored in advance) permitted by software in the host computer with the stored speed.

In the aforesaid embodiment, a laser beam printer is adopted as a printer. The present invention is not restricted to the laser beam printer. As far as a facility for creating spool files is included, the present invention can be implemented in a printer in which a print head is moved for scanning (for example, an ink-jet printer, a thermal transfer printer, a wire dot hammer printer). Needless to say, the present invention is adaptable to an LED printer or any other type of page printer. However, the creation of spool files has significant meaning with respect to a printer that has some appreciated capabilities and that is used frequently, and is more advantageous to a printer permitting high-speed printing; such as, a page printer or the like.

In the aforesaid embodiment, when a job completion flag appended to a job is set, the job is considered as bit map data. Alternatively, when a printer can selectively print recording media (paper) of a plurality of sizes, information representing a size of a recording medium (or the number of dots comprising one scanning line) is needed. Not all such jobs are therefore bit map data.

In the aforesaid embodiment, the host computer transmits the status request command through the same channel as it transmits normal print data. The request may be issued to the printer by changing logic levels of a signal sent over a dedicated signal line.

In the aforesaid embodiment, the host computer determines whether or not to activate the emulator, and transfers a set or reset flag to the printer. Alternatively, this procedure may be implemented in a stand-alone unit interposed between the host computer and printer. In this case, a memory having a certain capacity is incorporated or mounted in the stand-alone unit.

As described so far, according to the first embodiment, an intended result of printing can be provided quickly according to the state of a printer.

Next, the second embodiment of the present invention will be described in detail with reference to the drawings.

Figure 8:
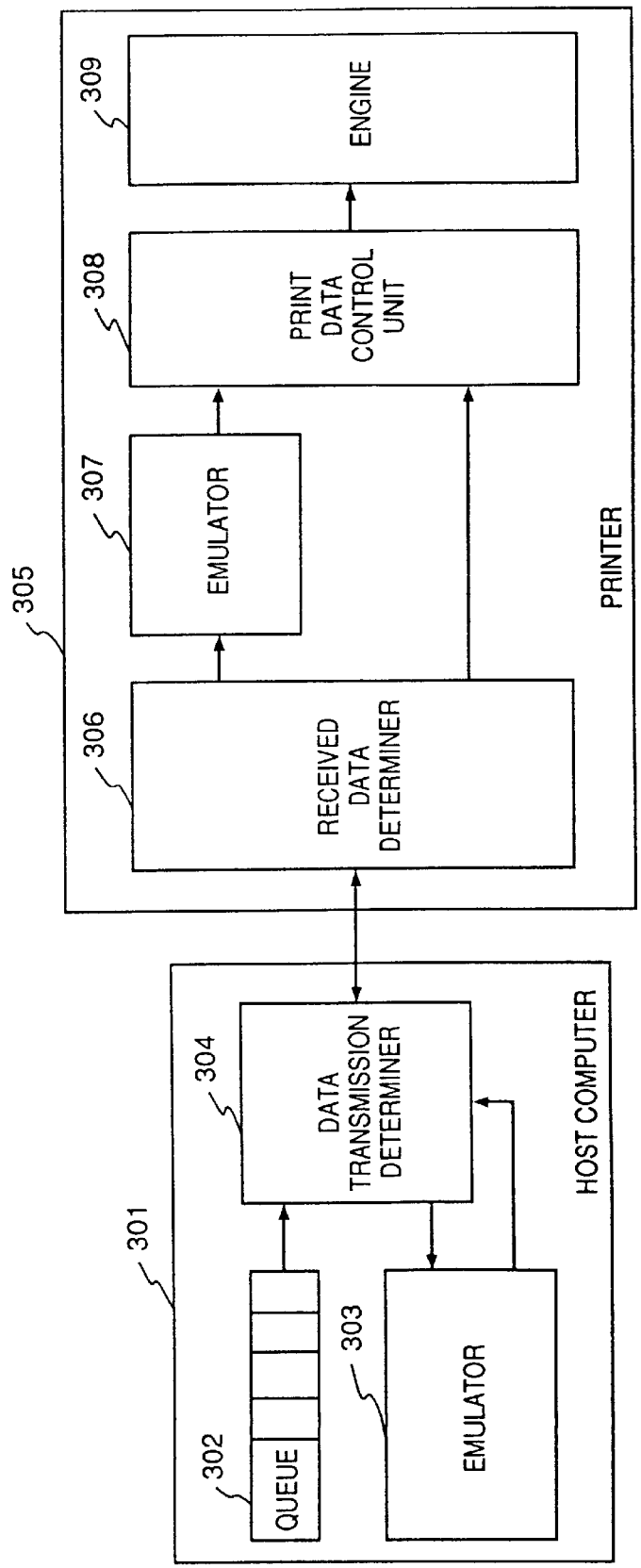
FIG. 8 is a block diagram showing the components of a host computer and a printer in the second embodiment.

FIG. 8 is a block diagram showing the components of a host computer and a printer in accordance with the second embodiment. In FIG. 8, reference numeral 301 denotes a host computer. 305 denotes a printer. 302 denotes a queue containing data written in printer language. 303 denotes an emulator for expanding data contained in the queue 302 into a bit map image. 304 denotes a data transmission determiner for determining whether data placed in the queue 302 or a bit map image expanded by the emulator 303 should be transmitted to the printer 305.

Reference numeral 306 denotes a received data determiner for receiving data from the host computer 301 and determining whether the received data is a bit map image or data written in printer language. 307 denotes an emulator for expanding data written in printer language into a bit map image. 308 denotes a print data control unit for controlling the order of print data. 309 denotes an engine for achieving printing according to an expanded bit map image.

Figure 9:
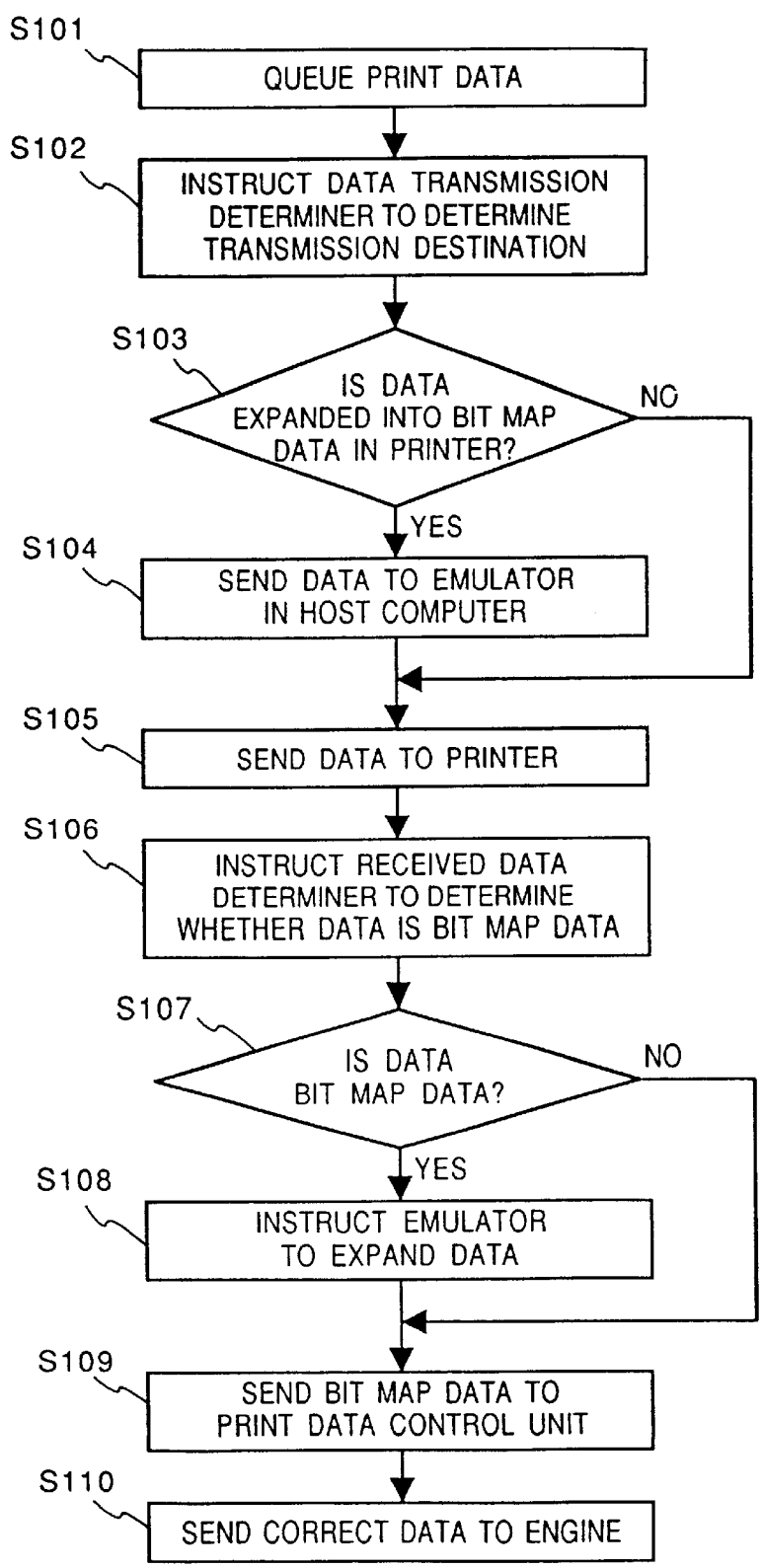
FIG. 9 is a flowchart describing job steps in the second embodiment.

The actions of the host computer 301 and printer 305 in the embodiment having the foregoing components will be described with reference to the flowchart of FIG. 9.

First, a user runs an application program or the like under the host computer 301 and executes printing. Print data is then placed in the queue 302 (step S101). The data transmission determiner 304 determines whether data should be expanded into a bit map image under the host computer 301 (step S102). The determination will be described in detail. If it is determined that data should be expanded into a bit map image under the host computer 301 (step S103), the data is sent to the emulator 303 and expanded into a bit map image (step S104), and then sent to the printer 305 (step S105). If it is determined that data written in printer language should be transmitted to the printer 305 as it is (step S103), the data is sent to the printer 305 as it is (step S105).

In the printer 305, the received data determiner 306 receives data and determines whether the received data is a bit map image or data written in printer language (step S106). If it is determined that the received data is data written in printer language (step S107), the emulator 307 expands the data into a bit map image (step S108) and sends the image to the print data control unit 308 (step S109). If it is determined that the received data is a bit map image (step S107), the data is sent to the print data control unit 308 as it is (step S109). The print data control unit 308 supervises the order of print data. When print data received is not the data that should be printed next, the print data is spooled and correct data is waited. When correct data is received, the data is first sent to the engine 309 (step S110).

The foregoing determination made by the data transmission determiner 304 will be described with reference to the flowchart of FIG. 10.

First, data is received from the queue 302 (step S201). It is then determined whether the received data is concerned with an odd page (step S202). If the received data is concerned with an odd page, the data is sent to the printer 305 (step S203). However, if the received data is concerned with an even page, the data is sent to the emulator 303 (step S204). It is then determined whether data still resides (step S205). If data resides, control is returned to step S201 and the determination is repeated. If no data resides, the determination is terminated.

<Variant>

Figure 10:
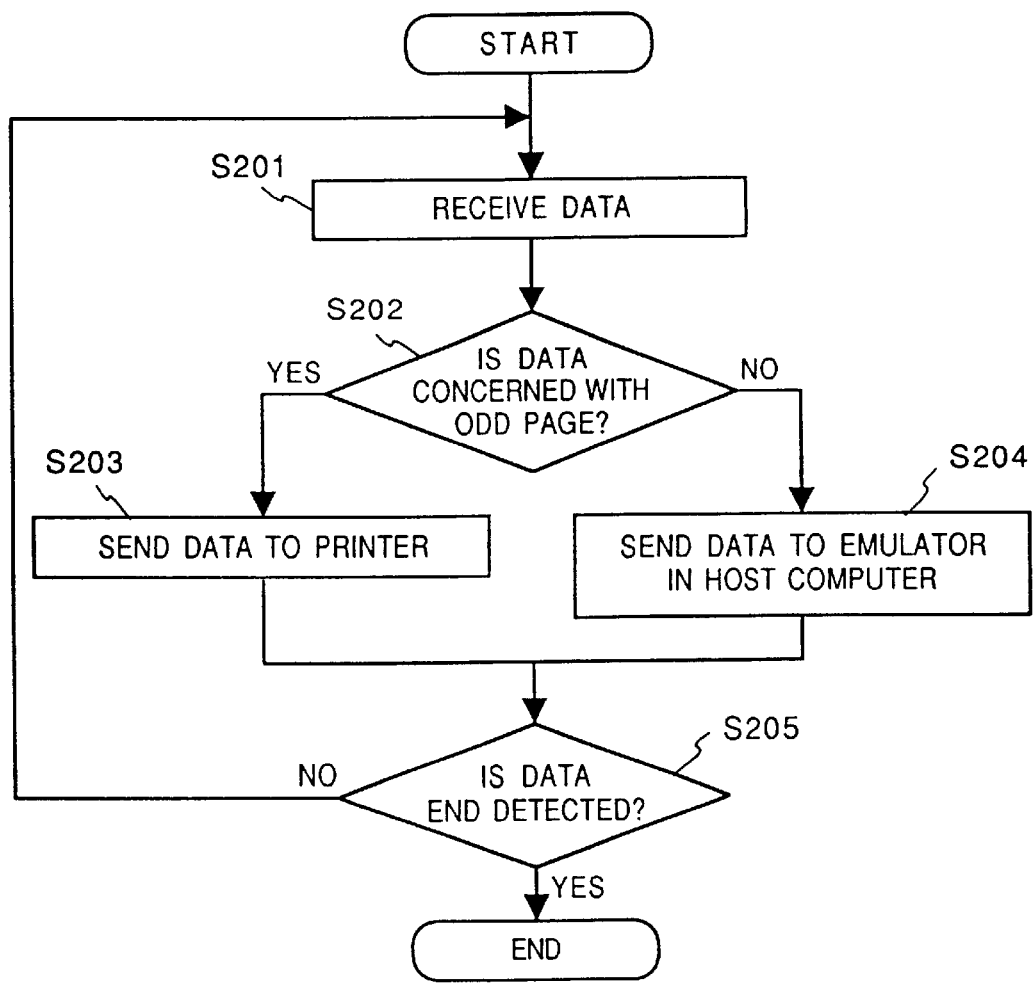
FIG. 10 is a flowchart describing determination performed by a data transmission determiner in the second embodiment.

At step S202 in FIG. 10, data concerning an even page is sent to the emulator and then to the printer 305. Data corresponding to an odd page is sent directly to the printer 305. On the contrary, data concerning an odd page may be sent to the emulator 303 and then to the printer 305, while data concerning an even page may be sent directly to the printer 305.

In the embodiment, print data is sent to the emulator 303 and then to the printer 305 in units of a page, or print data is sent directly to the printer 305. Alternatively, it is understood that print data may be analyzed in order to estimate the time required for the emulator 307 to expand the print data into a bit map image and the time required for the emulator 303 to expand the print data into a bit map image, and then the transmission destinations of data and the order of transmitting data may be determined on the basis of the estimated times. For example, it is estimated that three seconds would be required for the emulator 303 to complete expanding data concerning the first and second pages into bit map images and for the engine 309 to complete printing the resultant data. It is estimated that thirty seconds would be required for the emulator 307 to complete expanding data concerning the third page into a bit map image. In this case, the data transmission determiner 304 first transmits the data concerning the third page to the emulator 307, and then the data concerning the first and second pages to the emulator 303. Thus, the object of the present invention can be accomplished.

As described so far, according to the second embodiment, a means for expanding data written in printer language into a bit map image is installed in a host computer. Using this means in combination with a bit map image expanding means installed in a printer, an engine can be utilized fully.

The present invention may apply to a system comprising a plurality of equipment or to an apparatus including a sole equipment.

Needless to say, the present invention is adaptable to a system or an apparatus to which the aforesaid programs are installed.

As described, according to the second embodiment, a transmitting side determines whether data written in printer language should be transmitted or the data should be expanded into a bit map image and then transmitted. When receiving data written in printer language, a receiving side expands the data into a bit map image, controls the order of printing based on the bit map image, and thus achieves printing effectively.

As many apparently widely different embodiments of the present invention can be made without departing from the spirit and scope thereof, it is to be understood that the invention is not limited to the specific embodiments thereof except as defined in the appended claims.

What is claimed is:

1. A printer for recording a visible image on a recording medium using print data sent from an external unit and outputting a result of recording, said printer comprising:
   storage means for storing the print data sent from the external unit in the form of files sequentially in a print queue;
   determining means for determining whether a file stored in the print queue is of a first type having commands described in a printer language or of a second type containing a bit map image to be printed;
   control means for performing a printing process of files stored in the print queue so as to either produce and print a bit map image based on a file to be processed when said determining means determines that the file is of the first type, or print a bit map image contained in a file to be processed when said determining means determines that the file is of the second type; and
   returning means for returning information representing the number of unprocessed files residing in the print queue to said external unit in response to a query from said external unit, wherein said external unit determines the type of print data sent to said printer on the basis of the information by said returning means.

2. An external unit which transfers print data to a printer, said external unit comprising:
   determining means for sending a query to the printer and for determining a type of print data to be sent to the printer on the basis of information, which represents the number of unprocessed files residing in a print queue in the printer, sent from the printer in response to the query;
   expanding means for expanding data to be printed into a bit map image; and
   output means for outputting as print data either data described in a printer language or data representing a bit map image expanded by said expanding means, in accordance with the type of print data determined by said determining means,
   wherein said output means outputs the bit map image together with processed information.

3. An external unit according to claim 2, wherein when said determining means determines that the number of files of said print queue is large, said output means outputs the bit map image with the processed information which indicates that the output data is bit map data.

4. An external unit according to claim 2, wherein said determining means determines processing time of jobs executed in said printer according to information sent from said printer in response to the query.

5. An external unit which transfers print data to a printer, said external unit comprising:
   queuing means for queuing data described in a printer language;
   expanding means for expanding data queued by said queuing means into a bit map image;
   determining means for determining, on the basis of the number of unprocessed files in the printer, whether a bit map image expanded by said expanding means or data queued by said queuing means should be transferred; and
   transferring means for transferring either the bit map image expanded by said expanding means or the data queued by said queuing means to the printer in accordance with the determination by said determining means,
   wherein said transferring means transfers a determination result by said determining means.

6. An external unit according to claim 5, wherein said determining means achieves determination by checking if output data is concerned with an odd or even page.

7. An external unit according to claim 5, wherein said determining means achieves determination depending on the time required for expanding output data into a bit map image.

8. An external unit according to claim 5, wherein a determination by said determining means is based at least in part on processing time of jobs executed in said printer.

9. A printing system having a printer and an external unit which transfers print data to said printer, said printing system comprising:
   said external unit, where said external unit includes
   first determining means for sending a query to said printer and for determining a type of print data sent to said printer on the basis of information, which represents the number of unprocessed files residing in a print queue in said printer, sent from said printer in response to the query; and output means for outputting as print data either data described in a printer language or data representing a bit map image derived from said data described in a printer language, in accordance with the type of print data determined by said first determining means; and said printer, where said printer includes
> storage means for storing print data sent from said external unit in the form of files sequentially in the print queue; second determining means for determining whether a file stored in the print queue is of a first type having commands described in a printer language or of a second type containing a bit map image to be printed; control means for performing a printing process of files stored in the print queue so as to either produce and print a bit map image based on a file to be processed when said second determining means determines that the file is of the first type, or print a bit map image contained in a file to be processed when said second determining means determines that the file is of the second type; and returning means for returning information representing the number of unprocessed files residing in the print queue to said external unit in response to the query from said external unit, wherein said external unit determines the type of print data sent to said printer on the basis of the information from said returning means.

10. A printing system according to claim 9, wherein said first determining means of said external unit determines processing time of files processed in said printer according to the information sent from said printer in response to the query.

11. A printing system having a printer and an external unit which transfers print data to said printer, said printing system comprising:
> said external unit, where said external unit includes queuing means for queuing data described in a printer language; expanding means for expanding data queued in said queuing means into a bit map image; determining means for determining, on the basis of the number of unprocessed files in the printer, whether a bit map image expanded by said expanding means or data queued by said queuing means should be transferred; and transferred means for transferring either the bit map image expanded by said expanding means or the data queued by said queuing means to the printer in accordance with the determination by said determining means, wherein said transferring means transfers a determination result by said determining means; and
> said printer, where said printer includes
>> a bit map image expanding means for expanding data described in a printer language into a bit map image, in accordance with the determination result by said determining means; and control means for performing a printing process.

12. A printing system according to claim 11, wherein the determination by said determining means is based at least in part on processing time of files processed in said printer.

13. A control method for a printer that stores and manages print data in the form of files and sequentially prints print data, the method comprising the steps of:
> when print data to be transferred to the printer is provided, determining a type of print data sent to the printer on the basis of information, which represents the number of currently unprocessed files residing in a print queue in the printer;
> expanding data to be printed into a bit map image; and
> outputting either data described in a printer language or data that represents the bit map image expanded in said expanding step, according to the type of print data determined in said determining step,
> wherein, in said outputting step, the bit map image is output together with processed information.

14. A control method for a printer according to claim 13, wherein, in said determining step, a command requesting a state of printing is output to said printer and a determination is achieved depending on the information sent from said printer.

15. A control method for a printer according to claim 13, wherein, in said outputting step, when the number of currently unprocessed files is large, the bit map image is output with the processed information which indicates that the output data is bit map data.

16. A control method according to claim 13, wherein the determination in said determining step is based on processing time of jobs executed in said printer.

17. A control method for a printer that expands data described in a printer language into a bit map image and performs printing, the method comprising the steps of:
> obtaining the number of unprocessed files in a print queue in the printer;
> queuing the data described in a printer language;
> determining whether queued data should be transferred as a bit map image, based on the number of unprocessed files in the printer;
> expanding queued data into a bit map image; and
> transferring either the bit map image expanded by said expanding step or the data queued by said queuing step to the printer in accordance with the determination in said determining step,
> wherein said transferring step transfers determination result in said determining step.

18. A control method for a printer according to claim 17, wherein at said determining step, determination is achieved by checking if output data is concerned with an odd or even page.

19. A control method for a printer according to claim 17, wherein at said determining step, determination is achieved depending on the time required for expanding output data into a bit map image.

20. A control method according to claim 17, wherein a determination in said determining step is based at least in part on processing time of files processed in said printer.

21. A computer-readable medium having code stored thereon with computer-executable process steps for controlling a printer that stores and manages print data in the form of files and sequentially prints print data, said process steps comprising:
> a step of determining a type of print data sent to the printer on the basis of information, which represents the number of currently unprocessed files residing in a print queue in the printer, when print data to be transferred to the printer is provided;
> a step of expanding data to be printed into a bit map image; and
> a step of outputting either data described in a printer language or data that represents a bit map image expanded in said expanding step, according to the type of print data determined in said determining step,
> wherein, in said outputting step, the bit map image is output together with processed information.

22. A computer-readable medium according to claim 21, wherein, in said determining step, a command requesting a state of printing is output to the printer and determination is achieved depending on the information sent from the printer.

23. A computer-readable medium according to claim 21, wherein, in said outputting step, when the number of currently unprocessed files is large, the bit map is output with the processed information which indicates that the output data is bit map data.

24. A computer-readable medium according to claim 21, wherein said determining step determines processing time of jobs executed in said printer.

25. A control method for a printer that expands data described in a printer language transferred from a host computer into a bit map image and performs printing, the method comprising the steps of:
  receiving either data described in the printer language or a bit map image, in a case where the host computer determines whether data described in the printer language should be transmitted or the data should be expanded into a bit map image prior to being transmitted on the basis of time required to expand the data into a bit map image and either the data or the bit map image is transferred from the host computer on the basis of the determination;
  expanding data received in said receiving step into a bit map image in a case where the data described in the printer language is received; and
  controlling a page order of printing that prints the bit map image independent of a received page order.

26. A control method according to claim 25, wherein the determination is performed by checking if a transferred page is concerned with an odd or even page.

27. A control method for a host computer connected to a printer, where a bit map image based on data described in a printer language is printed at the printer, the method comprising the steps of:
  determining whether data described in the printer language should be transmitted or the data should be expanded into a bit map image on the basis of the time required to expand the data into the bit map image;
  expanding data to be printed into a bit map image; and
  transferring either the data described in the printer language or the bit map image to the printer in accordance with the determination,
  wherein, in said transferring step, the bit map image is transferred together with processed information.

28. A control method according to claim 27, wherein the determination in said determining step is performed by checking if a transferred page is concerned with an odd or even page.

29. A control method for a printing system having a printer and a host computer, the printer printing a bit map image on the basis of data described in a printer language, the method comprising the steps of:
  determining whether data described in the printer language should be transferred from the host computer to the printer or the data should be expanded into a bit map image prior to being transferred on the basis of time required to expand the data into a bit map image;
  transferring either the data described in the printer language or the bit map image from the host computer to the printer in accordance with the determination in said determining step;
  expanding the data into a bit map image in a case where the data described in the printer language is transferred from the host computer to the printer; and
  controlling a page order of printing that prints the bit map image independent of a received page order.

30. A control method according to claim 29, wherein the determination in said determining step is performed by checking if a transferred page is concerned with an odd or even page.

31. A printer that expands data described in a printer language sent from a host computer into a bit map image and performs printing, the printer comprising:
  a receiver for receiving data described in the printer language or a bit map image, where the host computer determines whether data described in the printer language should be transmitted to said printer or the data should be expanded into a bit map image prior to being transmitted on the basis of time required to expand the data into a bit map image and either the data or the bit map image is transferred from the host computer on the basis of the determination; and
  a processor for expanding data into a bit map image in a case where the data described in the printer language is received and controlling a page order of printing that prints the bit map image independent of a received page order.

32. A printer according to claim 31, wherein the determination is performed by checking if a transferred page is concerned with an odd or even page.

33. A host computer connected to a printer, the printer for printing a bit map image based on data described in a printer language, said host computer comprising:
  a processor for determining whether data described in the printer language should be transmitted to the printer or the data should be expanded into a bit map image prior to being transmitted on the basis of time required to expand the data into a bit map image;
  an emulator for expanding data to be printed into a bit map image; and
  an interface for transferring either the data described in the printer language or the bit map image to the printer side in accordance with the determination,
  wherein the bit map image is transferred together with processed information via the interface.

34. A host computer according to claim 33, wherein the determination by said processor is performed by checking if a transferred page is concerned with an odd or even page.

35. A printing system having a printer and a host computer, the printer printing a bit map image on the basis of data described in a printer language,
  said host computer comprising:
    a first processor for determining whether data described in the printer language should be transmitted to the printer or the data should be expanded into a bit map image prior to being transmitted on the basis of the time required to expand the data into a bit map image; and
    an interface for transferring either the data described in the printer language or the bit map image to the printer in accordance with the determination, and
  said printer comprising:
    a receiver for receiving either the data described in the printer language or the bit map image transferred as a result of the determination; and a second processor for expanding data into a bit map image in a case where the data described in the printer language is received from the host computer and for controlling a page order of printing that prints the bit map image independent of a received page order.

36. A printing system according to claim 35, wherein the determination by said first processor is performed by checking if a transferred page is concerned with an odd or even page.

37. A control method for a host computer connected to a printer, where a bit map image is printed at the printer based on data described in a printer language, said control method comprising:

a determination step of determining whether the data described in the printer language should be transmitted or expanded into a bit map image before transmission on the basis of a time required to expand the data into a bit map image; and a transferring step of transferring the data described in the printer language to the printer if it is determined that the data described in the printer language should be transmitted, and expanding the data described in the printer language into a bit map image to transfer the bit map image to the printer if it is determined that the data described in the printer language should be expanded into a bit map image before transmission, wherein, in said determination step, the time required for the printer to expand the data into a bit map image and the time required for the host computer to expand the data into a bit map image are estimated, and if the printer can expand a page following a first plurality of pages into a bit map image while the host computer expands the first plurality of pages into a bit map image, it is determined that the page following the first plurality of pages should be transmitted as data described in the printer language and the first plurality of pages should be expanded into a bit map image before transmission.

38. A control method for printing system including a printer and a host computer, the printer printing a bit map image on the basis of data described in a printer language, said control method comprising the steps of:

determining, in the host computer, whether the data described in the printer language should be transmitted or expanded into a bit map image before transmission on the basis of a time required to expand the data into a bit map image, and transferring the data described in the printer language to the printer if it is determined that the data described in the printer language should be transmitted, and expanding the data described in the printer language into a bit map image to transfer the bit map image to the printer if it is determined that the data described in the printer language should be expanded into a bit map image before transmission; and receiving, in the printer, either the data described in the printer language or the bit map image transferred as a result of the determination based on the time required to expand the data into a bit map image, expanding data into a bit map image if the data described in the printer language is received and controlling a page order of printing that prints the bit map image independent of the received page order, wherein the host computer estimates the time required for the printer to expand the data into a bit map image and the time required for the host computer to expand the data into a bit map image, and determines that if the printer can expand a page following a first plurality of pages into a bit map image while the host computer expands the first plurality of pages into a bit map image, the page following the first plurality of pages should be transmitted as data described in the printer language and the first plurality of pages should be expanded into a bit map image before transmission.

39. A host computer connected to a printer, where a bit map image is printed at the printer based on data describe in a printer language, said host computer comprising:

determination means for determining whether the data described in the printer language should be transmitted or expanded into a bit map image before transmission on the basis of a time required to expand the data into a bit map image; and transferring means for transferring the data described in the printer language to the printer if it is determined that the data described in the printer language should be transmitted, and expanding the data described in the printer language into a bit map image to transfer the bit map image to the printer if it is determined that the data described in the printer language should be expanded into a bit map image before transmission, wherein the determination means estimates the time required for the printer to expand the data into a bit map image and the time required for the host computer to expand the data into a bit map image, and determines that if the printer can expand a page following a first plurality of pages into a bit map image while the host computer expands the first plurality of pages into a bit map image, the page following the first plurality of pages should be transmitted as data described in the printer language and the first plurality of pages should be expanded into a bit map image before transmission.

40. A printing system having a printer and a host computer, the printer for printing a bit map image on the basis of data described in a printer language, said host computer comprising:

determination means for determining whether the data described in the printer language should be transmitted or expanded into a bit map image before transmission on the basis of a time required to expand the data into a bit map image; and transferring means for transferring the data described in the printer language to said printer if it is determined that the data described in the printer language should be transmitted, and expanding the data described in the printer language into a bit map image to transfer the bit map image to said printer if it is determined that the data described in the printer language should be expanded into a bit map image before transmission; and said printer comprising:

reception means for receiving either the data described in the printer language or the bit map image transferred as a result of the determination based on the time required to expand the data into a bit map image; and control means for expanding data into a bit map image if the data described in the printer language is received and for controlling a page order of printing that prints the bit map image independent of the received page order, wherein said host computer estimates the time required for said printer to expand the data into a bit map image and the time required for said host computer to expand the data into a bit map image, and determines that if said printer can expand a page following a first plurality of pages into a bit map image while said host computer expands the first plurality of pages into a bit map image, the page following the first plurality of pages should be transmitted as data described in the printer language and the first plurality of pages should be expanded into a bit map image before transmission.

* * * * *

UNITED STATES PATENT AND TRADEMARK OFFICE
CERTIFICATE OF CORRECTION

PATENT NO. : 6,862,100 B2
DATED : March 1, 2005
INVENTOR(S) : Takuto Harada

It is certified that error appears in the above-identified patent and that said Letters Patent is hereby corrected as shown below:

Column 11,
Line 39, "transferred" should read -- transferring --.

Column 12,
Line 30, "determination" should read -- a determination --.

Column 13,
Line 1, "map" should read -- map image --.

Column 15,
Line 26, "printing" should read -- a printing --.

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,862,100 B2
DATED : March 1, 2005
INVENTOR(S) : Takuto Harada

It is certified that error appears in the above-identified patent and that said Letters Patent is hereby corrected as shown below:

Title page,
Item [56], References Cited, U.S. PATENT DOCUMENTS,
"4,640,634 A   2/1987      Ozawa et al" should be deleted.
FOREIGN PATENT DOCUMENTS,
"DE    195 35 326    3/1997" should be deleted;
"EP    0 522 754     1/1993" should be deleted;
"JP    10-76731      3/1998" should be deleted; and
"WO    89/09135      10/1989" should be deleted.
OTHER PUBLICATIONS,
"Blaskovic et al., "Spring-Loaded Automatic Belt Tensioner", *IBM Technical Disclosure Bulletin*, vol. 24, No. 1A, Jun. 1981." should be deleted.

Signed and Sealed this

Twenty-ninth Day of November, 2005

JON W. DUDAS
*Director of the United States Patent and Trademark Office*